United States Patent [19]

Dye

[11] 4,092,054
[45] May 30, 1978

[54] SEAL ARRANGEMENT FOR ROLLING CUTTER

[75] Inventor: James H. Dye, Breckenridge, Tex.

[73] Assignee: Subterranean Tools Inc., Breckenridge, Tex.

[21] Appl. No.: 598,577

[22] Filed: July 24, 1975

[51] Int. Cl.² .................. F16C 33/66; F16C 1/24
[52] U.S. Cl. ........................... 308/8.2; 175/337; 175/371; 308/77; 308/187.1
[58] Field of Search .................. 308/8.2, 76, 77; 175/337, 371, 372

[56] References Cited

U.S. PATENT DOCUMENTS

| 3,572,727 | 3/1971 | Greiner | 277/91 |
| 3,804,425 | 4/1974 | Goodfellow | 277/92 |
| 3,861,765 | 1/1975 | Follert et al. | 277/92 |
| 3,884,312 | 5/1975 | Williams | 175/372 |
| 3,982,595 | 9/1976 | Ott | 175/371 |

Primary Examiner—Richard A. Bertsch
Attorney, Agent, or Firm—Lawrence R. Burns; Melvin A. Crosby

[57] ABSTRACT

A sealing arrangement for a rolling cutter designed to protect the antifriction bearings disposed between a support shaft and a rotatable outer body of the rolling cutter. A sealing arrangement is provided comprising at least two seal means located outward from the antifriction bearing of a rolling cutter and further comprising a cavity means between the two seal means so that flushing coolant, fluid or grease may be injected into the sealing arrangement and, when injected, will carry heat, dirt and other contaminants outward and away from the interior of a rolling cutter thereby preventing damage to the antifriction bearings and the seal means located nearest to the antifriction bearings.

14 Claims, 6 Drawing Figures

SEAL ARRANGEMENT FOR ROLLING CUTTER

BACKGROUND OF THE INVENTION

Rolling cutters used for earth boring, tunnel boring or reducing rock formations must be designed to survive in a very hostile environment. When in operation, grit developed during the reduction of rocks and earth material has an extremely fine component and is highly abrasive. Because of the fineness of the grit, the abrasive particles are carried as part of the surrounding atmosphere and seals of the prior art have found it difficult, if not impossible, to prevent the ingress of these abrasive particles into the antifriction bearings of the rolling cutters.

The abrasive particles first attack the rotary seal means used by the prior art which then begins to deteriorate rapidly and allows the abrasive particles further ingress into the antifriction bearings and the bearing grease surrounding the antifriction bearings. Once this situation develops, the antifriction bearings fail quite rapidly destroying the entire rolling cutter before an economically useful life can be realized.

Another part of the hostile environment which the rolling cutters must survive in is the considerable shock developed when crushing hard rock formations. The hard rock formations do not reduce uniformly, thereby causing the rolling cutter to traverse a non-uniform path as it moves over the hard rock formations.

A great deal of shock-loading is, therefore, developed which, in turn, causes relative movement of the structural members of the rolling cutter when in operation. Any seal developed for a rolling cutter must, of course, take into account such relative movement and still seal against the fine abrasive particles in the surrounding atmosphere.

Seals have been developed in the prior art that can and do compensate for relative structural movement upon shock-loading and have had some degree of success in keeping the fine abrasive particles from reaching the antifriction bearings.

One such seal of the prior art is known as the "Stellite metallic seal" and is known under the trade name "Cartriseal Alloyseal" and is used in conjunction with an elastomeric material. This prior art seal will be described further in the detailed description of the drawings but a brief description at this point is necessary.

The Stellite metallic seal may be briefly described as two rings of the same diameter and being rectangular in cross section. The rings are made of a material known as Stellite which is a pure, high chrome-high carbon material capable of producing a very high polished surface such as being lapped to 3 microns finish. The extreme flatness and high polish may be put on a side face of each ring such that the two polished surfaces may be abutted together in a sealing arrangement between rotating and nonrotating members.

The highly polished surfaces, when abutted together on the one side and sealed on the other side with an elastomeric seal between the Stellite ring and its respective member, form an effective seal against relative structural member movement within the rolling cutter.

Seals of the above type have been used effectively in the prior art, the Stellite metallic seal being mentioned by way of example only, but there are still major drawbacks of such seals.

A further part of the hostile environment that the rolling cutter operates in involves itself with the operating temperatures of the environment. Heat is developed in the rolling cutters due to the external friction of the rotatable outer body and, also, the action of the comminution of the hard rock formations. Temperatures of around 200° Fahrenheit are commonly encountered in tunnel boring and operations of the like. The Stellite seal, when subjected to temperatures of 200° Fahrenheit and the fine abrasive dust particles, tends to gall and fail more rapidly than at lower temperatures.

Further, the elastomeric material which is acting in cooperation with the Stellite metallic seal is adversely affected, also, and begins to fail in its sealing action.

BRIEF SUMMARY OF THE INVENTION

According to the present invention, a seal arrangement is provided, especially for a rolling cutter having a support shaft, a rotatable outer body and a bearing means operatively disposed between the support shaft and the rotatable outer body.

Seal retainers are provided on the lateral opposing ends of the rolling cutter. A first seal means is spaced outwardly of the bearing means between the seal retainers and the rotatable outer body to seal the bearing means from the outside environment. A second seal means is spaced outwardly of the first seal means between the seal retainers and the rotatable outer body and a communicating cavity is provided connecting the first seal means with the second seal means.

The second seal means allows limited fluid flow outward from the first seal means but substantially no fluid flow toward the first seal means. A means for introducing fluids into the communicating cavity is provided so that flushing coolant or fluid may be introduced into the rolling cutter during operation and will flow outwardly from said bearing means and first sealing means carrying heat, dirt and contaminants away from the bearing area.

If neither heat nor dust is a problem in production drilling, then the means for introducing the flushing coolant or fluid may be plugged and a means for introducing lubricating grease is provided so that the communicating cavity may be filled with lubricating grease. When the communicating cavity is filled with grease, the rolling cutter can be periodically raised and new grease introduced into the communicating cavity, thereby causing the old grease to flow outwardly from said bearing means on said first seal means.

It is, therefore, an object of the present invention to provide a sealing arrangement which is efficient and long lasting when a rolling cutter is operating in its natural environment.

It is a further object of the present invention to simply and efficiently seal a rolling cutter and, in addition, reduce part of the abrasive dust fines in the surrounding atmosphere.

It is a further object of the present invention to provide a sealing arrangement that is easily adaptable to the various environmental conditions encountered in different types of cutting operations.

Other objects and advantages of the present invention will be readily apparent upon reference to the following specification taken in connection with the accompanying drawings in which.

DETAILED DESCRIPTION OF THE INVENTION

Figure 1:
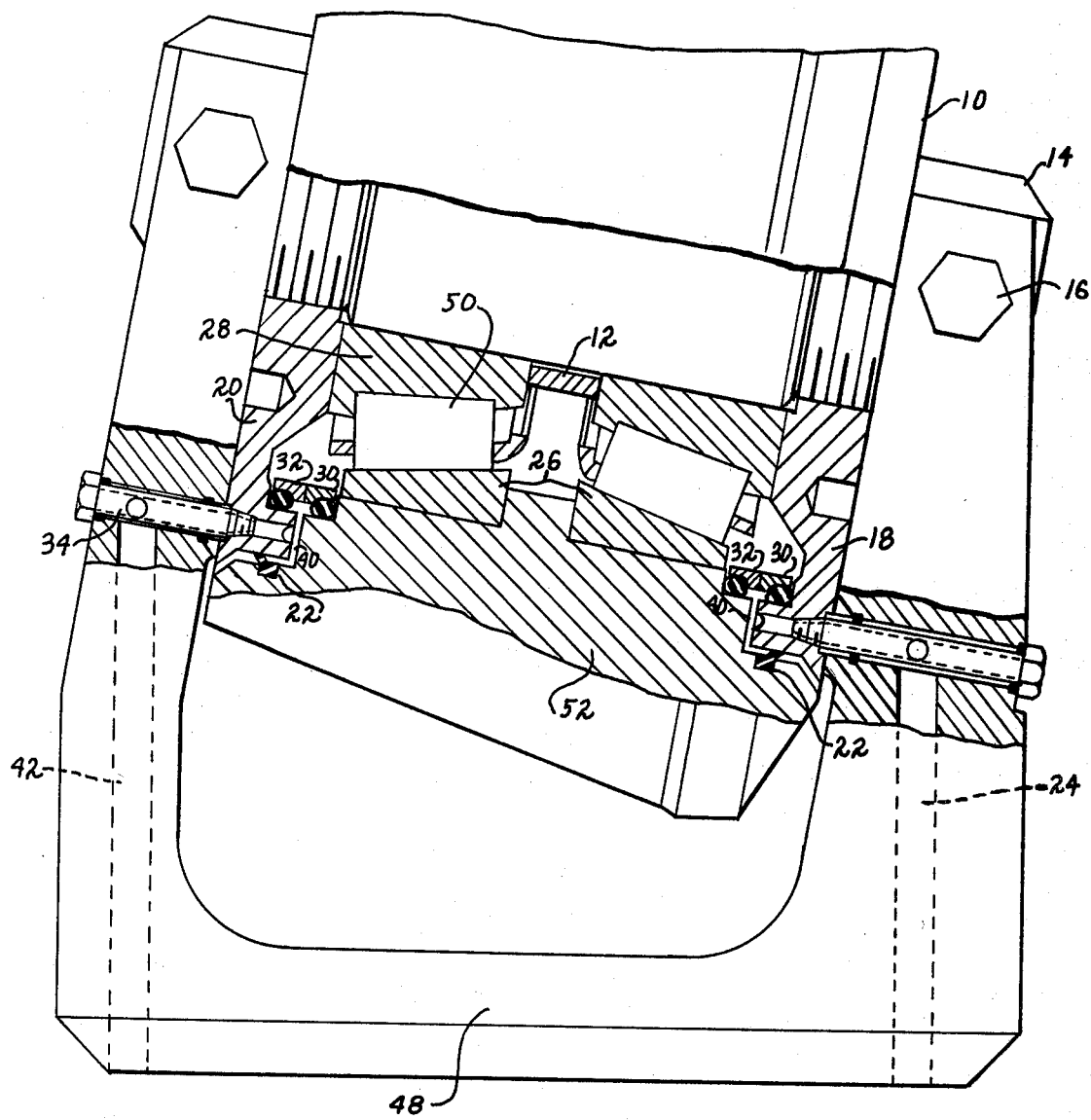
FIG. 1 shows a partially cut away view of the construction of a rolling cutter and a seal arrangement according to the present invention.

In FIG. 1 is shown a general arrangement of a support yoke 48 and rolling cutter 10. Support yoke 48 has upstanding legs which receive and support rolling cutter support shaft 14, securing bolts 16 holding support shaft 14 to support yoke 48 during cutting operations. The middle portion of support shaft 14 is cylindrically shaped and an inner bearing race 28 is provided around the central portion of support shaft 14 to provide an inner raceway for an antifriction bearing 50.

Outwardly of the antifriction bearing 50, an outer raceway 26 is provided for supporting rotatable outer body 52 whose outer surface is usually provided with some form of hardened compacted wear resistant inserts (not shown) to provide a longer life for the rotatable outer body 52 of the rolling cutter 10. End plate seal retainers 18 and 20 are provided in close fitting relationship with rotatable outer body 52 and the seal retainers 18 and 20 are fixedly held abutting the inside surfaces of the upstanding legs of support yoke 48.

Located between the end plate seal retainers 18 and 20 is the first seal means 30, 32. Preferably, metal ring 30 can be made from a Stellite metallic material. Stellite material is a pure, high chrome-high carbon alloy material capable of taking a very smooth and highly polished surface. There is a seal means on each side of the rotatable outer body and each of the seal means comprises two Stellite metallic rings having highly polished flat abutting side faces with each other.

The other sides of the rings are sealed using an elastomeric material between the rotatable outer body 52 and its respective Stellite metallic ring 30 and the end plate seal retainer 18 and its respective Stellite metallic ring 30. In operation of the rolling cutter 10, then one of the Stellite metallic seal rings 30 rotates in relation to its abutting counterpart Stellite metallic ring.

The elastomeric material such as O-rings placed on either side of the pair of rings 30 force the rings together and hold them in an abutting manner. The smooth and highly polished abutting side faces allow rotation of one ring upon the other while also providing a seal between the rings 30.

In addition, the size of the abutting side faces can be chosen such that when the shock-loading is imposed upon the rolling cutter and the rotatable outer body undergoes relative vertical movement in relation to the support, the side faces of the abutting Stellite rings will still be in sealing engagement with one another and their relative vertical movement upon one another provides a wiper-type effect which aids in keeping their surfaces clean.

Outward from the first seal means 30 and 32, which is preferably a Stellite metallic seal means, a cavity 40 is formed between the rotatable outer body 52 and the end plate seal retainers 18 and 20, the cavity extending outwardly from the first seal means to the outside environment of the rolling cutter 10.

A second seal means 22 is located outwardly from the bearing means along the cavity 40 from the first seal means, the second seal means being preferably in the form of a lip seal design. The lip seal design, as pictured in FIG. 1, is located and held in an annular groove formed in rotatable outer body 52, the lip seal means forming a static and dynamic seal between the rotatable outer body 52 and the end seal retainer plates 18 and 20.

Interconnecting into cavity 40 between the first seal means 30, 32 and the second seal means 22 is a passageway extending externally of the rolling cutter 10 construction. In FIG. 1, this passageway is provided by a connecting tubes 34 which are located in the upstanding legs of yoke means 48 and end plate seal retainers 18 and 20.

Fluid can be furnished to the exterior ends of tubes 34 by almost any means but, preferably, fluid supply passages 24 and 42 are formed in the upstanding legs of yoke means 48. The yoke means 48 is usually attached to a base member (not shown) and the fluid can be easily routed through the base member to the yoke means 48.

Figure 2:
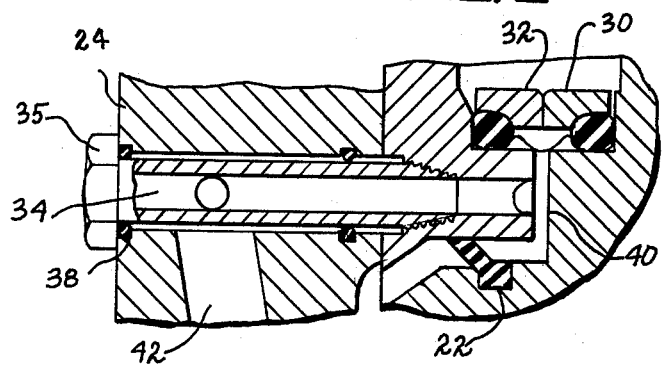
FIG. 2 shows an enlarged view of the sealing arrangement of FIG. 1.

In FIG. 2 is shown an enlarged view of one side of the sealing arrangement for a rolling cutter 10 according to the present invention. The first seal means 30, 32, which is preferably the Stellite metallic seal as described above, is shown sealing between the rotatable outer body 52 and end plate seal retainer 20, the first seal means being outwardly from bearing means 50.

Thus, the first seal means 22 is a somewhat effective seal against the outside environment. According to the present invention, a cavity 40 is formed between the rotatable outer body 52 and the end plate seal retainer 20. This cavity 40 extends outwardly from the rolling cutter 10 construction to the outside environment. A second seal means 22 is located outwardly along the cavity 40 and provides a second seal means 22 between rotatable outer body 52 and end plate seal retainer 20.

This second seal means is preferably in the form of a lip seal design with its base portion seated in the rotatable outer body and its lip portion slidably engaging a surface of the end plate seal retainer 20. A tube 34 is extended through an upstanding leg of support yoke 24 and delivers fluid to the cavity 40 from the outside of the yoke.

A preferred arrangement of tube 34 in yoke 24 leg is a plug member 35 sealing the tube outwardly of the yoke leg and holes provided in tube 34 to communicate with still another passageway that extends upwardly in yoke 24's leg from the base to the tube element 34. In this manner, yoke 24 may be attached to a base member which may rotate about its axis, the base member supplying fluid to the yoke without any special fluid supply lines being exposed to the outside environment and damaged thereby.

Located outwardly of the first seal means 30, 32 is a second seal means 22. Preferably, this second seal means is in the form of a lip seal design and, as pictured, is seated in rotatable outer body 52 and has a sliding sealing contact with end plate seal retainer 20. The projection of the lip seal 22 that engages the end plate seal retainer slants outwardly in the cavity 40 from the rotatable outer body 52 to the end plate seal retainer 20.

The lip seal is so designed and placed so that a limited flow of fluid outwardly through lip seal 22 is permitted when pressurized to a certain level. The pressure acting outwardly along cavity 40 also serves to hold lip seal 22 in place on the rotatable outer body 52. Should a vacuum ever develop in cavity 40, or the outside pressure become greater than the fluid pressure in cavity 40, seal means 22 provides an effective seal permitting substantially no flow of any material inwardly of lip seal 22.

This is an advantageous feature in that, at some times in the rolling cutter's life, the constantly changing conditions of temperature can create such a vacuum or reverse of pressures that dirt and debris could be pulled into the cavity were it not for lip seal 22. As can be seen from the slanting projection of lip seal 22 that slidably engages end plate seal retainer 20, the reverse pressure differential would aid lip seal 22 in effectively sealing against retainer 20.

According to FIG. 2 then, a flushing coolant fluid may be continuously flushed through rolling cutter 10 when rolling cutter 10 is working in a very dry, dusty, hot atmosphere. The flushing coolant could be fed down a drill string (not shown) through a base member (not shown) at the bottom of the drill string and up through the upstanding legs of yoke 24. The flushing coolant would then pass into tube 34 and be directed toward cavity 40.

O-rings are advantageously provided at each end of tube 40 in the upstanding leg of yoke 24 to prevent the flushing coolant from passing around the tube 34 and into the outside environment. A continuous stream of flushing coolant passing into cavity 40 will first surround the first seal means 30, 32 which is, preferably, a Stellite metallic seal arrangement. The flushing cooland coming into contact with the Stellite metallic seal produces several results. The fluid flushes away any contaminants that may be in or around those surfaces and also cools the metallic seal.

The flushing coolant then fills the cavity 40 outwardly toward the second seal means 22 which is, preferably, a lip seal. When the cavity 40 is filled, the pressure of the continuous flow of flushing coolant holds the lip seal 22 firmly engaged with the rotatable outer body 52 while bending the projection of lip seal 22 away from the end plate seal retainer 20. This small clearance then allows flushing coolant to flow outwardly into the outside environment of rolling cutter 10.

Under normal circumstances, this outward flow would be continuous; however, if interrupted for any reason, lip seal 22 closes automatically upon reduction in pressure or flow and seals off cavity 40 from the outside environment. The continuous outward flow of flushing coolant from the seal 22 into the outside environment provides yet another functional advantage.

The spraying of the flushing fluid in the hole being cut reduces the number of dust fines or particles that would normally be in the surrounding air of the rolling cutter. The flushing coolant then, when continuously fed through the rolling cutter, provides a multiplicity of advantageous results, all of which enhance the economical life of the rolling cutter 10.

The continuous flow of flushing coolant, first of all, helps lubricate the Stellite metallic seal; secondly, it carries away any heat building up on the Stellite metallic seal which might cause either the metal to gall or the O-rings to fail; thirdly, it flushes contaminants outwardly and away from the bearing means and the Stellite metallic seal; fourthly, it holds up seal 22 in place; and, finally, as it exits into the outside environment, it helps to reduce the dust fines in the surrounding atmosphere.

Figure 3:
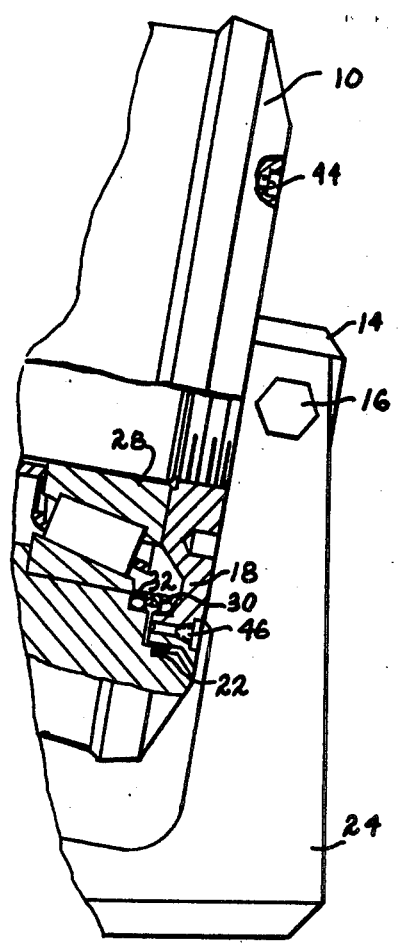
FIG. 3 shows a modification of the sealing arrangement of the present invention.

Looking now to FIG. 3, there are some modifications that can be made to the above described sealing system in the event that it is not desired to have a continuous flow of flushing coolant fluid or it is not necessitated by the cutting conditions. If neither dust nor heat is a problem in drilling, then tube 34 may be eliminated from the upstanding leg of yoke 24 and the internal passageways sealed off. A pipe plug 46 may then plug the opening into cavity 40 and a grease zerk 44 may be placed near the top of rolling cutter 10 and communicates into cavity 40 near the top of the rolling cutter.

Grease or lubricants now, when injected through grease zerk 44, would completely fill cavity 40. The cavity 40 filled with grease would tend to transfer heat and contaminants to the outside of the rolling cutter 10. In addition, with the grease filling cavity 40, the small amount of dirt and contaminants which could possibly enter through lip seal 22 would find it even more difficult to penetrate inwardly of the rolling cutter 10.

Periodically, on a routine basis, additional grease could be injected through grease zerk 44 with the used lubricant or grease being forced to the outside of rolling cutter 10 through lip seal 22. This, again, has the benefit that all contaminants are routinely flushed out of rolling cutter 10.

Figure 5:
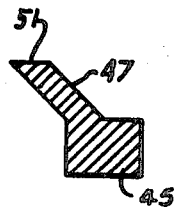
FIG. 5 shows a cross sectional view of the lip seal of FIG. 4 at V—V.
Figure 6:
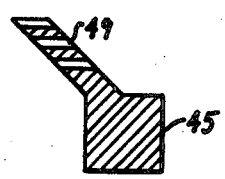
FIG. 6 shows a modification of the lip seal cross section of FIG. 5.
Figure 4:
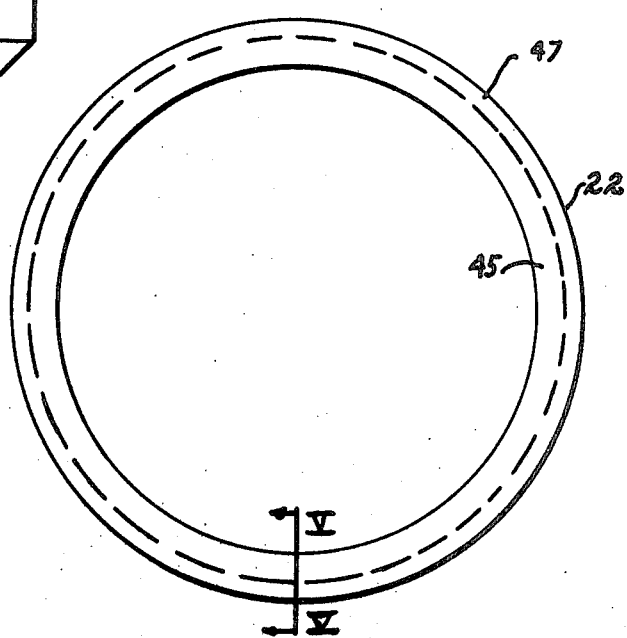
FIG. 4 shows a lip seal used in the present invention.

In FIGS. 4, 5 and 6, the preferred seal means 22 is shown in a lip seal configuration. The material of construction may be any pliable resilient material capable of performing the functions as described herein. Preferably, according to the present invention, the lip seal material is molythane. The configuration of lip seal 22 is such that there is a rectangular main body portion 45 which seats in a complimentary shaped groove in rotatable outer body 52 of rolling cutter 10.

Projecting from rectangular body portion 45 is the projection portion 47 that seals cavity 40 by abutting face 51 slidably against an end plate seal retainer 20. The projection 47, when assembled in rolling cutter 10, is angled or designed so that there is a resilient force exerted through face 51 to hold it in contact with end plate seal retainer 20.

In FIG. 6 is shown a slight modification of the projection portion 47 of lip seal 22 that is preferably used when flushing coolant being continuously fed through rolling cutter 10. Holes or perforations 49 can be formed in projection 47 which helps to effect a spray outwardly of the rolling cutter which is useful in suppressing dust and washing away the pulverized rock from the drilling face and saddle interior.

What is claimed is:

1. A rolling cutter having a central portion in the form of a support shaft, an outer body rotatable relative to said support shaft, bearing means operatively interposed between said shaft and said outer body, first seal means sealing between said outer body and shaft adjacent said bearing, second seal means sealing between said outer body and said shaft and spaced from said first seal means so as to define a cavity bounded by said seal means and said shaft and said outer body, means for conducting fluid into one end of said cavity, so as to flush fluid outwardly from said second seal means.

2. A rolling cutter according to claim 1 in which said means for conducting said fluid comprises a passage in said nonrotatable portion affording communication with said cavity and from externally of the rolling cutter.

3. A rolling cutter according to claim 2 in which said second seal means is biased so as to allow a limited fluid flow outwardly from said bearing means and substantially no fluid flow inwardly toward said bearing means.

4. A rolling cutter according to claim 2 which further includes means supplying a flushing fluid into said cavity so that contaminant materials are forced outward from said first seal means through said second seal means.

5. A rolling cutter according to claim 2 which further includes means supplying a cooling fluid into said cavity to convey heat outwardly from said first seal means through said second seal means.

6. A rolling cutter according to claim 2 which further includes means supplying a flushing coolant into said cavity to carry heat and contaminants outwardly away from said first seal means and through said second seal means.

7. A rolling cutter according to claim 2 which further includes means supplying grease into said cavity.

8. A rolling cutter according to claim 7 which further includes said second seal means comprising a removable plug at the outward end of said cavity.

9. A rolling cutter according to claim 1 which further includes providing said second seal means with perforations therein.

10. A rolling cutter according to claim 1 wherein said first seal means comprises a pair of rigid rings having opposed slidingly interengaged side faces for sealing between the rings and elastomeric seal ring means between one rigid ring and the rotatable outer body and between the other rigid ring and said support shaft.

11. A rolling cutter having a central portion in the form of a support shaft, an outer body rotatably relative to said support shaft, bearing means operatively interposed between said shaft and said outer body, a first seal means sealing between said shaft and said outer body and comprising a pair of rigid ceramic material rings having opposed slidingly interengaged side faces for sealing between the rings and elastomeric seal ring means between one rigid ring and the rotatable outer body and between the other rigid ring and the support shaft, a second seal means sealing between said outer body and said shaft and spaced from said first seal means so as to define a cavity bounded by said seal means, said shaft and said outer body, and means for conducting fluid into one end of said cavity so as to flush fluid outwardly from said second seal means.

12. A rolling cutter having a central portion in the form of a support shaft, an outer body rotatable relative to said support shaft, bearing means operatively interposed between said shaft and said outer body, a first seal means sealing between said shaft and said outer body and comprising a pair of rigid metallic material rings having opposed slidingly interengaged side faces for sealing between the rings and elastomeric seal ring means between one rigid ring and the rotatable outer body and between the other rigid ring and the support shaft, a second seal means sealing between said outer body and said shaft and spaced from said first seal means so as to define a cavity bounded by said seal means, said shaft and said outer body, and means for conducting fluid into one end of said cavity so as to flush fluid outwardly from said second seal means.

13. A rolling cutter having a central portion in the form of a support shaft, an outer body rotatable relative to said support shaft, bearing means operatively interposed between said shaft and said outer body, first seal means sealing between said outer body and shaft adjacent said bearings, second seal means comprising a lip seal sealing between said outer body and said shaft and spaced from said first seal means so as to define a cavity bounded by said seal means and said shaft and said outer body, means for conducting fluid into one end of said cavity, so as to flush fluid outwardly from said second seal means.

14. A rolling cutter according to claim 13 in which said lip seal means is biased so as to allow a limited fluid flow outwardly from said bearing means and substantially no fluid flow inwardly toward said bearing means.

* * * * *